US007082322B2

(12) United States Patent
Harano

(10) Patent No.: US 7,082,322 B2
(45) Date of Patent: Jul. 25, 2006

(54) PORTABLE RADIO TERMINAL UNIT

(75) Inventor: Nobuya Harano, Shizuoka (JP)

(73) Assignee: NEC Corporation, Tokyo (JP)

( * ) Notice: Subject to any disclaimer, the term of this patent is extended or adjusted under 35 U.S.C. 154(b) by 215 days.

(21) Appl. No.: 10/441,204

(22) Filed: May 20, 2003

(65) Prior Publication Data

US 2003/0220128 A1 Nov. 27, 2003

(30) Foreign Application Priority Data

May 22, 2002 (JP) ............................ 2002-147154

(51) Int. Cl.
*H04B 1/38* (2006.01)
*H04M 1/00* (2006.01)

(52) U.S. Cl. ............... 455/575.1; 455/90.3; 455/575.5; 455/575.7

(58) Field of Classification Search ............. 455/575.1, 455/575.5, 90.3, 575.7
See application file for complete search history.

(56) References Cited

U.S. PATENT DOCUMENTS 5,451,965 A 9/1995 Matsumoto
6,301,468 B1* 10/2001 Slayton et al. ........... 455/575.3
6,336,037 B1 1/2002 Sekine et al.
6,353,443 B1* 3/2002 Ying .......................... 715/702
6,535,172 B1 3/2003 Hirabayashi
6,781,550 B1* 8/2004 Shoji et al. ................. 343/702
2001/0029173 A1 10/2001 Ogino
2002/0033773 A1 3/2002 Hirabayashi
2002/0075186 A1* 6/2002 Hamada et al. ...... 343/700 MS

FOREIGN PATENT DOCUMENTS

CN 1188387 7/1998
CN 2344883 10/1999
EP 0 323 614 A3 7/1989
EP 0 590 671 A1 4/1994
EP 0 749 214 A3 11/2000
FR 2 679 086 A1 1/1993
GB 2 358 315 A 7/2001
GB 2 367 189 A 3/2002
JP 63-86929 4/1988
JP 4-66839 6/1992
JP 4-110007 9/1992
JP 4-128440 11/1992
JP 5-4683 1/1993
JP 6-97713 4/1994
JP 9-321529 12/1997
JP 10-117108 5/1998
JP 10-190330 7/1998
JP 11-98051 4/1999
JP 11-177327 7/1999
JP 11-355023 12/1999

(Continued)

*Primary Examiner*—Jean Gelin

*Assistant Examiner*—Un C. Cho

(74) *Attorney, Agent, or Firm*—Foley & Lardner LLP

(57) ABSTRACT

In a portable radio terminal unit, when a built-in antenna is provided, influence of user's body is to be reduced as small as possible to prevent deterioration of antenna characteristics. The built-in antenna is arranged in contact with a microphone unit positioned at lower portion of a unit casing. The microphone unit is mounted on a front casing forming the casing. Therefore, the built-in antenna is also mounted on the front casing. Thus, even during calling and browsing display, the built-in antenna may not contact with a user's head or may not be covered by the user's hand to reduce deterioration of the antenna characteristics for maintaining more stable communication characteristics.

8 Claims, 6 Drawing Sheets

FOREIGN PATENT DOCUMENTS

| | | | |
|---|---|---|---|
| JP | 2000-165124 | | 6/2000 |
| JP | 2001-217627 | A | 8/2001 |
| JP | 2001-346285 | | 12/2001 |
| JP | 2002-92576 | | 3/2002 |
| WO | WO 00/30267 | A1 | 5/2000 |
| WO | WO 00/30268 | | 5/2000 |
| WO | WO 01/15267 | A1 | 3/2001 |
| WO | WO 03/003505 | A1 | 1/2003 |

* cited by examiner

PORTABLE RADIO TERMINAL UNIT

BACKGROUND OF THE INVENTION

1. Field of the Invention

The present invention relates generally to a portable radio terminal unit. More particularly, the invention relates to a compact portable radio terminal unit, such as a cellular telephone unit housing an antenna within a unit casing.

2. Description of the Related Art

Associating with evolution of mobile communication in the recent years, technical advancement and down-sizing of portable radio terminal are quickly progressed. In general, upon calling using the cellular telephone unit as the portable radio terminal, unless using earphone microphone or the like, user inherently use the unit holding in hand and placing the unit in the vicinity of a head. On the other hand, in case of key operation upon transmitting electronic mail message or the like or in case of watching a screen, the user uses the unit with holding in hand.

When the antenna is built-in a main body portion of the terminal unit for down-sizing of the unit of the portable radio terminal and for improving portability, it becomes necessary to make the antenna as small as possible. In such case, it is likely that the user may contact with a portion near the antenna by hand or user's head or users ear may be in close proximity of the antenna to significantly deteriorate antenna characteristics.

Namely, when the antenna is built in the unit body with down-sizing, it becomes necessary to mount the antenna at a position where the antenna does not contact with the head, hand, ear and the like. Selection of the mounting position is quite important for antenna characteristics. For instance, when the antenna is arranged on an upper portion of a casing (receiver side) of the terminal unit, the user's head is inherently positioned close to the antenna during voice communication to deteriorate the antenna characteristics. On the other hand, even if the antenna is arranged on a lower portion of the casing (microphone side) of terminal unit, when the antenna is mounted on the rear casing side opposite to the front casing where the operation panel is provided, the portion near the antenna can be covered by the hand of the user to be a cause of deterioration of the antenna characteristics.

SUMMARY OF THE INVENTION

It is therefore an object of the present invention to provide a portable radio terminal unit which reduces deterioration of the antenna characterisitics by user's body to maintain satable communication characteristics when the antenna is made compact and built in a unit body.

Another object of the present invention is to provide a portable radio terminal unit which facilitates connection between an antenna and a circuit board and assembling when the antenna is down-sized and built in a unit body.

According to the present invention, a portable radio terminal unit having an antenna built in a unit body, comprises:

the antenna mounted on a front casing in the vicinity of a microphone unit, the antenna including an antenna conductor, a reinforcement member for reinforcing the antenna conductor, and a connector terminal connecting the antenna conductor and the radio circuit, and the antenna conductor, the reinforcement member and the connector terminal being integrated.

The reinforcement member may be a resin mold and the antenna conductor and the connector terminal are integrated by the resin mold. The connector terminal may be formed with a part of the antenna conductor.

The connector terminal may be a probe shape. Also, the connector terminal may be a resilient member. On the other hand, the connector terminal may be a coil shape. The antenna conductor maybe a plate form conductor, a bar shaped conductor, a spiral shape conductor or a stripe form conductor.

In operation of the present invention, when the antenna is down-sized and built in the unit body, the compact antenna is built in a position where is hardly covered by a user's body, particularly user's head, hand or so forth. As the mounting position, the built-in antenna is mounted on the front casing where the operation panel is mounted and at lower portion of the casing in the vicinity of the microphone unit.

On the other hand, the antenna has a structure where the antenna conductor, the reinforcement member reinforcing the antenna conductor, such as resin mold, and the connector terminal are integrated.

By this, the built-in antenna may not contact with the user's body and may not be covered by the user's body to reduce deterioration of antenna characteristics. Also, connection of the antenna with the radio circuit board or assembling of the antenna into the unit can be facilitated.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of a portable ratio terminal unit according to the present invention with reference to the accompanying drawings. In the following description, numerous specific details are set forth in order to provide a thorough understanding of the present invention. It will be obvious, however, to those skilled in the art that the present invention may be practiced without these specific details.

Figure 1:
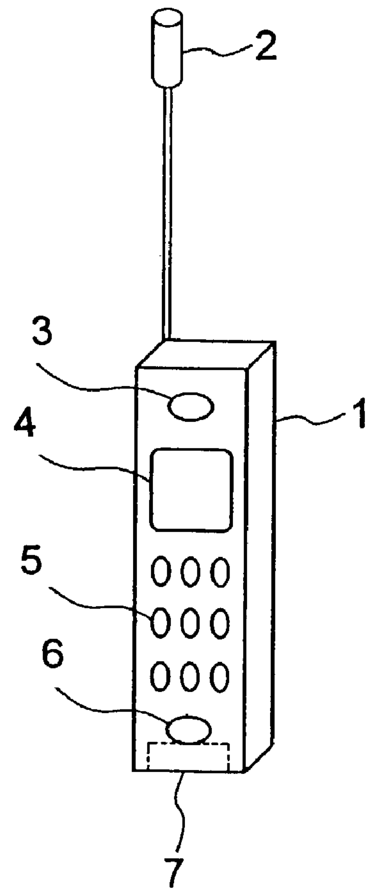
FIG. 1 is an illustration showing a mounting position of a built-in antenna in the preferred embodiment of a portable radio terminal unit according to the present invention.

FIG. 1 is an illustration showing a mounting position of a built-in antenna in the preferred embodiment of a portable radio terminal unit according to the present invention. Referring to FIG. 1, an external antenna 2, a receiver 3, a display portion 4, operation keys 5 and a microphone unit 6 are mounted in a casing 1. Furthermore,in the casing 1, a compact built-in antenna 7 is also mounted. The built-in antenna 7 is provided below the microphone unit 6 in contact with the microphone unit.

Figure 2:
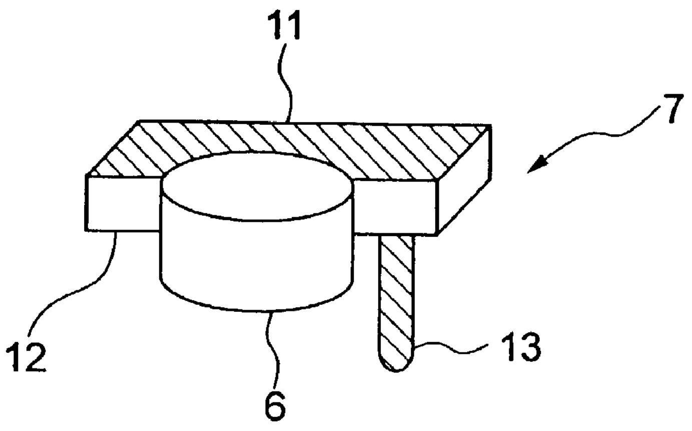
FIG. 2 is an illustration showing a relationship of positions between the built-in antenna and a microphone unit in the preferred embodiment of the portable radio terminal unit according to the present invention.

FIG. 2 is a perspective view showing a detail of the relationship of positions between the built-in antenna 7 and the microphone unit 6. The microphone unit 6 and the antenna 7 are provided in close proximity with each other so that a part of the microphone unit 6 is surrounded by the antenna 7. It is also possible to surround the entire periphery of the microphone unit 6 with the antenna 7. As shown in FIG. 2, the antenna 7 is constructed with an element conductor 11, a resin mold 12 serving as a reinforcement member reinforcing the element conductor 11, and a connector terminal 13 for electrically connecting the element conductor 11 with the circuit board (unit board) 10 mounted a radio circuit (see FIG. 3).

Figure 3:
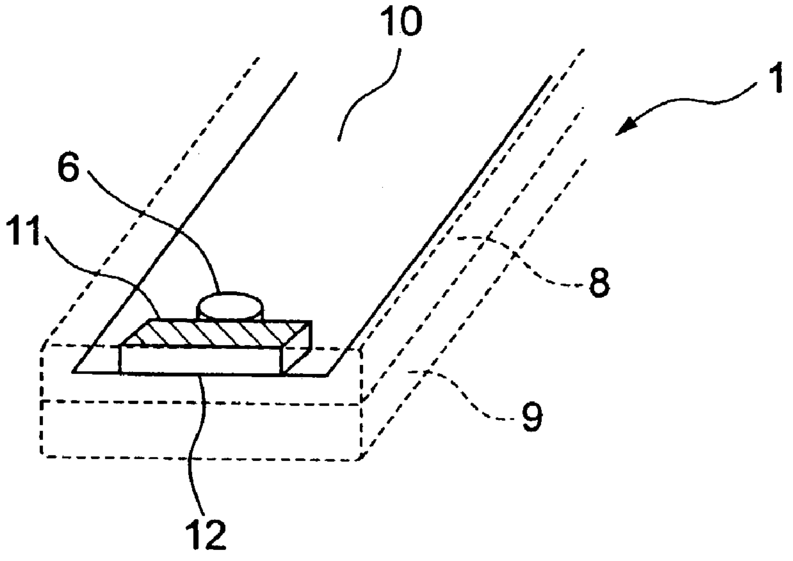
FIG. 3 is an illustration showing a mounting position of the antenna within the casing in the preferred embodiment of the portable radio terminal unit according to the present invention.

FIG. 3 is an illustration showing a mounting condition of the built-in antenna 7 within the casing 1. The casing 1 is formed with a front casing 8 and a rear casing 9. On the front casing 8, operation keys 5 (see FIG. 1) are mounted. The rear casing 9 forms back surface of the casing 1. The microphone unit 6 is mounted on the front casing 8. Between the front casing 8 and the rear casing 9, a unit board (circuit board) is mounted by clamping. The built-in antenna is arranged at the lowermost portion of the front casing 8 (position lower than the microphone unit 6) as being clamped between the front casing 8 and the unit board 10.

At this time, it is a manner of course that the connector terminal 13 shown in FIG. 2 is electrically connected to a terminal portion of a radio circuit preliminarily provided on the unit board 10. The element conductor 11 is provided on the resin mold 12 and reinforced. The connector terminal 13 is implanted in the resin mold 12 for conduction with the element conductor 11. The element conductor 11, the resin mold 12 and the connector terminal 13 are integrally molded.

Figure 4:
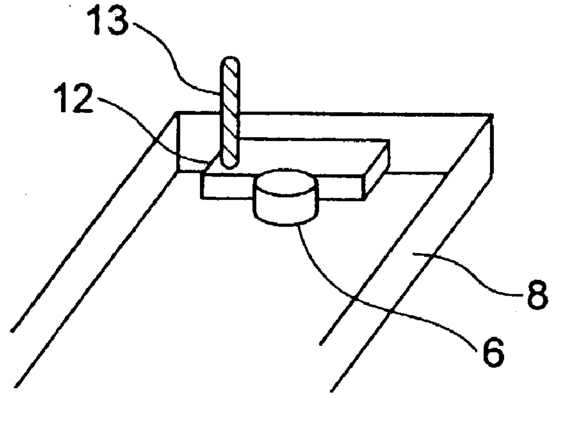
FIG. 4 is an illustration showing a condition where the antenna is mounted in a front casing in the preferred embodiment of the portable radio terminal unit according to the present invention.
Figure 5A:
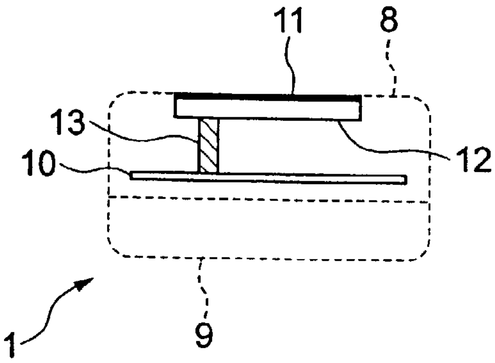
FIGS. 5A and 5B are illustrations showing a condition where the antenna is mounted in the casing in the preferred embodiment of the portable radio terminal unit according to the present invention.
Figure 5B:
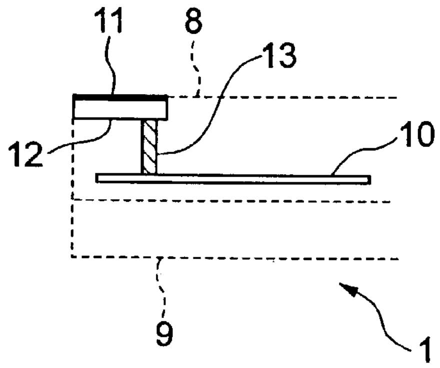

FIG. 4 is an illustration showing a condition where the antenna 7 is assembled in the front casing 8. The resin mold 12 is mounted on the front casing 8. At this time, the resin mold 12 is arranged in contact with the microphone unit 6. The connector terminal 13 is positioned so as to contact with a predetermined terminal of the unit board 10. FIGS. 5A and 5B are illustrations showing the case where the built-in antenna is assembled in the casing 1. wherein FIG. 5A is an illustration of the casing 1 as viewed from the bottom surface, and FIG. 5B is an illustration of the casing 1 as viewed from the side. The connector terminal 13 is a probe shaped terminal in the shown embodiment and contacted with the predetermined terminal of the unit board 10.

In general, the built-in antenna mounted within the unit cause deterioration of characteristics as being influenced by user's head or hand during porting or calling associating with down-sizing of the unit. On the other hand, the recent portable radio terminal is designed to perform diversity reception selectively using two antennas, i.e. the external antenna and the built-in antenna. There is relatively high possibility that the external antenna is affected by the user's head during calling and, at the same time, the built-in antenna is affected by the user's hand to deteriorate characteristics in both antennas.

Therefore, in consideration that the user may be aware of impossibility of calling when the microphone is blocked by the finger during calling, according to the present invention, the built-in antenna 7 is arranged within the front casing in the vicinity of the microphone unit for reducing deterioration of the antenna characteristics due to influence of the user's hand.

Figure 6:
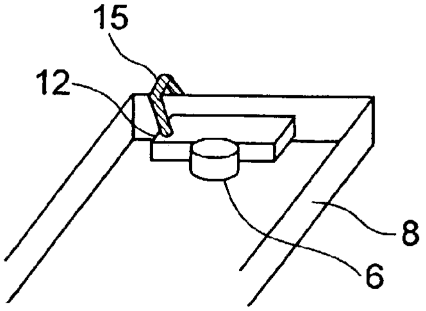
FIG. 6 is an illustration showing another embodiment of the portable radio terminal unit according to the present invention.

FIG. 6 is an illustration showing another embodiment of the portable radio terminal unit according to the present invention. The shown embodiment is different from the former embodiment in that a connector terminal of a built-in antenna is formed with a spring form terminal 15. Other construction is the same as the former embodiment. The spring form terminal 15 is implanted in the resin mold 12. As shown in FIG. 7, when the resin mold 12 is mounted on the front casing 8, the spring form terminal 15 contacts with the predetermined terminal of the unit board 10 to enable electrical connection between the antenna conductor and the radio circuit. By employing the spring form terminal 15, electrical connection is certainly established. The spring form terminal 15 may be an elastic member formed of conductive metal in general.

Figure 7A:
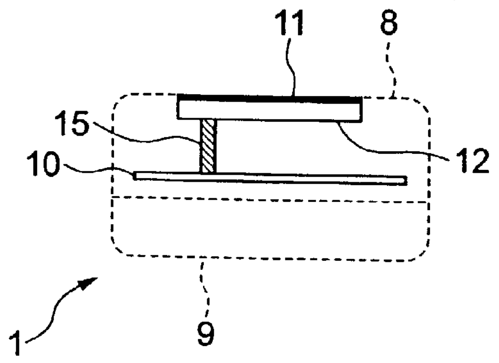
FIGS. 7A and 7B are illustrations showing a condition where the antenna is built in the casing in the embodiment of FIG. 6.
Figure 7B:
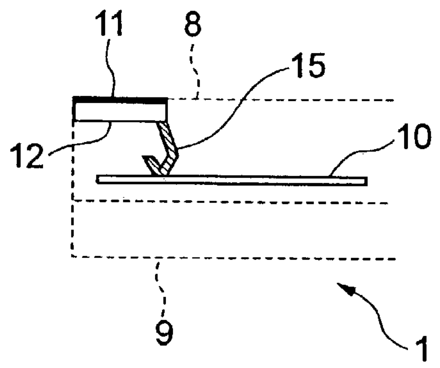

It should be noted that, FIG. 7A is an illustration showing the casing as viewed from the bottom surface and FIG. 7B is an illustration showing the casing as viewed from the side.

Figure 8:
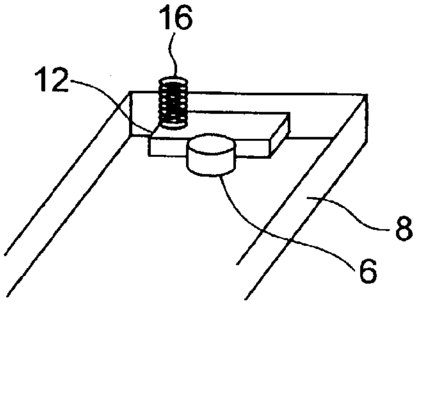
FIG. 8 is an illustration showing a further embodiment of the portable radio terminal unit according to the present invention.
Figure 9A:
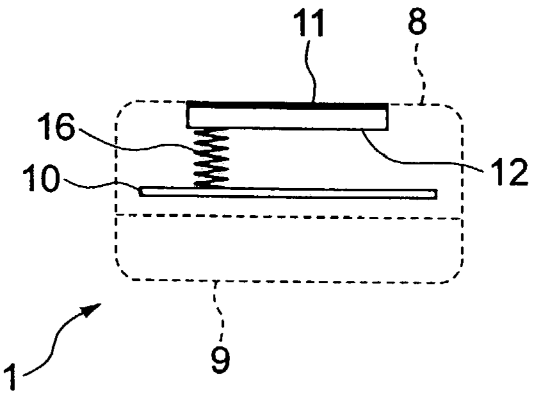
FIGS. 9A and 9B are illustrations showing a condition where the antenna is built in the casing in the embodiment of FIG. 8.
Figure 9B:
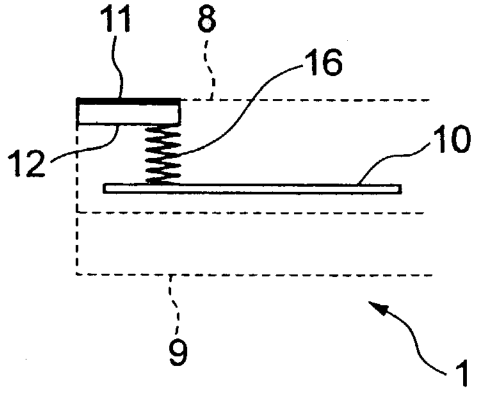

FIG. 8 is an illustration showing a further embodiment of the portable radio terminal unit according to the present invention. In the shown embodiment, a connector terminal of a built-in antenna is formed with a coil form terminal 16. Other construction is the same as the former embodiments. FIGS. 9A and 9B are illustrations showing a condition mounted the built-in antenna within the casing 1, wherein FIG. 9A is an illustration of the casing as viewed from the bottom surface and FIG. 9B is an illustration of the casing as viewed from the side.

Figure 10:
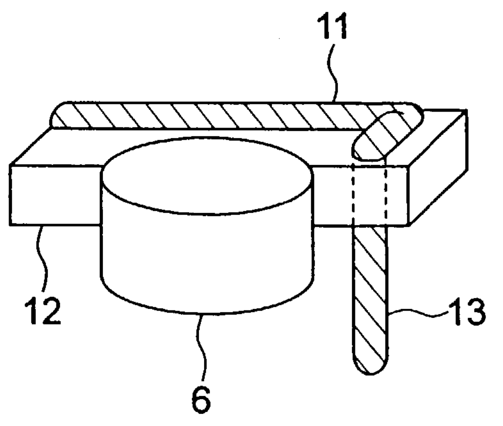
FIG. 10 is an illustration showing a still further embodiment of the portable radio terminal unit according to the present invention.

FIG. 10 is an illustration showing a still further embodiment of the portable radio terminal unit according to the present invention, in which the element conductor 11 of the antenna of the built-in antenna is formed into bar shape. In a groove portion of the resin mold 12, the bar shaped element conductor 11 is embedded.

Figure 11:
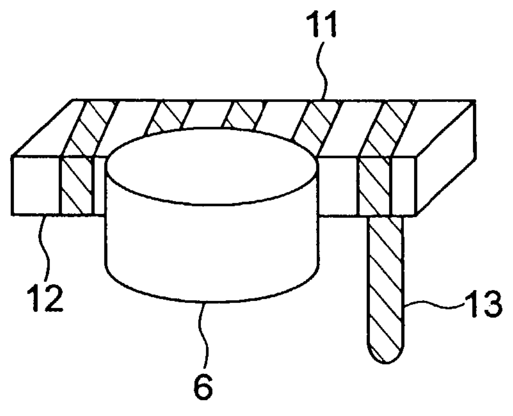
FIG. 11 is an illustration showing a yet further embodiment of the portable radio terminal unit according to the present invention.

FIG. 11 is an illustration showing a yet further embodiment of the portable radio terminal unit according to the present invention, in which the element conductor 11 is formed into thin plate form (stripe form). The thin plate form element conductor 11 is wrapped around the resin mold 12 in spiral fashion (coil shape).

Figure 12:
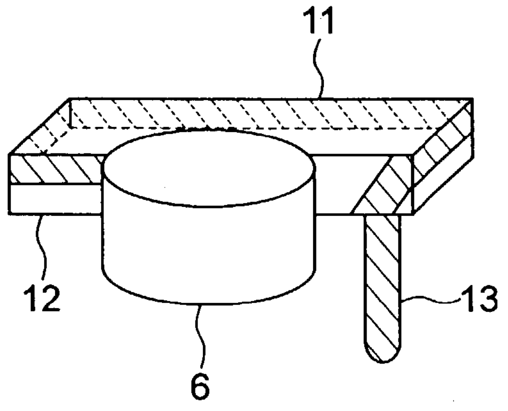
FIG. 12 is an illustration showing a yet further embodiment of the portable radio terminal unit according to the present invention.

FIG. 12 is an illustration showing a yet further embodiment of the portable radio terminal unit according to the present invention, in which the element conductor 11 is formed into thin plate form (stripe form). This is provided on the four side surfaces of the resin mold 12 (wrapping around the side surface) into substantially quadrangular shape.

In these embodiments shown in FIGS. 10 to 12, the connector terminal 13 may be any of the probe shape, spring shape, coil shape similarly to the former embodiment, as a matter of course.

As set forth above, with the present invention, since the built-in antenna is arranged in the front casing, in which the microphone unit is mounted, in contact with the microphone unit. Therefore, during calling or browsing the display portion, contacting of the user's head or hand to the antenna can be avoided to reduce deterioration of the antenna characteristics significantly to maintain stable communication characteristics.

On the other hand, since the built-in antenna is formed into a module and the connector terminal is integrated with the antenna, mounting of the built-in antenna in the front casing can be simplified, and establishing of electrical connection between the radio circuit and the antenna can be facilitated.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A portable radio terminal unit having an antenna built in a unit body, comprising:

the antenna mounted on a front casing in the vicinity of a microphone unit, wherein the front casing and a back casing of the unit body enclose the antenna and the microphone unit, and the microphone unit is arranged on the front casing, said antenna including an antenna conductor, a reinforcement member for reinforcing said antenna conductor, and a connector terminal connecting said antenna conductor and a radio circuit, wherein said antenna conductor, said reinforcement member and said connector terminal being integrated, and wherein said reinforcement member is a resin mold and said antenna conductor and said connector terminal are integrated by said resin mold, wherein said reinforcement member has a rectangular surface and said antenna conductor is a bar shaped conductor embedded in a groove on the rectangular surface, said bar shaped conductor consisting of only one side portion that extends along a length direction of the rectangular surface and another side portion that extends along a width direction of the rectangular surface.

2. A portable radio terminal unit as set forth in claim 1, wherein said connector terminal is formed with a part of said antenna conductor.

3. A portable radio terminal unit as set forth in claim 1, wherein said connector terminal is a probe shape.

4. A portable radio terminal unit as set forth in claim 1, wherein said connector terminal is a resilient member.

5. A portable radio terminal unit as set forth in claim 1, wherein said connector terminal is a coil shape.

6. A portable radio terminal unit according to claim 5 wherein both said coil connector and said antenna are completely arranged inside said unit body.

7. A portable radio terminal unit having an antenna built in a unit body, comprising:

the antenna mounted on a front casing in the vicinity of a microphone unit, wherein the front casing and a back casing of the unit body enclose the antenna and the microphone unit, and the microphone unit is arranged on the front casing, said antenna including an antenna conductor, a reinforcement member for reinforcing said antenna conductor, and a connector terminal connecting said antenna conductor and a radio circuit, wherein said antenna conductor, said reinforcement member and said connector terminal being integrated, and wherein said reinforcement member is a resin mold and said antenna conductor and said connector terminal are integrated by said resin mold, wherein said reinforcement member is formed as a rectangular parallelepiped and said antenna conductor is a stripe form conductor comprising a plurality of continuous parallel stripes that extend along three surfaces of the rectangular parallelepiped reinforcement member.

8. A portable radio terminal unit having an antenna built in a unit body, comprising:

the antenna mounted on a front casing in the vicinity of a microphone unit, wherein the front casing and a back casing of the unit body enclose the antenna and the microphone unit, and the microphone unit is arranged on the front casing, said antenna including an antenna conductor, a reinforcement member for reinforcing said antenna conductor, and a connector terminal connecting said antenna conductor and a radio circuit, wherein said antenna conductor, said reinforcement member and said connector terminal being integrated, and wherein said reinforcement member is a resin mold and said antenna conductor and said connector terminal are integrated by said resin mold, wherein said reinforcement member is formed as a rectangular parallelepiped and said antenna conductor is a plate stripe form conductor comprising a plurality of continuous parallel stripes that extend along four side surfaces of the rectangular parallelepiped reinforcement member.

* * * * *